US012439018B2

(12) United States Patent
Hsiang et al.

(10) Patent No.: US 12,439,018 B2
(45) Date of Patent: Oct. 7, 2025

(54) STEREOSCOPIC DISPLAY DEVICE FOR REDUCING INTERFERENCE OF STEREOSCOPIC IMAGE CROSSTALK

(71) Applicant: Acer Incorporated, New Taipei (TW)

(72) Inventors: Jui-Chieh Hsiang, New Taipei (TW); Chih-Chiang Chen, New Taipei (TW); Chao-Shih Huang, New Taipei (TW)

(73) Assignee: Acer Incorporated, New Taipei (TW)

( * ) Notice: Subject to any disclaimer, the term of this patent is extended or adjusted under 35 U.S.C. 154(b) by 209 days.

(21) Appl. No.: 18/347,559

(22) Filed: Jul. 6, 2023

(65) Prior Publication Data

US 2024/0372977 A1 Nov. 7, 2024

(30) Foreign Application Priority Data

May 4, 2023 (TW) .................. 112116557

(51) Int. Cl.
*H04N 13/00* (2018.01)
*G09G 3/00* (2006.01)
*H04N 13/282* (2018.01)
*H04N 13/296* (2018.01)
(Continued)

(52) U.S. Cl.
CPC .......... *H04N 13/296* (2018.05); *G09G 3/003* (2013.01); *H04N 13/282* (2018.05); *H04N 13/305* (2018.05); *G09G 2300/0447* (2013.01); *G09G 2300/0452* (2013.01); *G09G 2320/068* (2013.01); *G09G 2330/027* (2013.01); *H04N 13/383* (2018.05)

(58) Field of Classification Search
CPC .. H04N 13/296; H04N 13/305; H04N 13/282; G09G 3/003; G09G 2013/0074–0096; G09F 19/125
See application file for complete search history.

(56) References Cited

U.S. PATENT DOCUMENTS 9,641,829 B2    5/2017  Saigo et al.
2007/0126669 A1* 6/2007 Seto ..................... G09G 3/2003
                                                          345/76
(Continued)

FOREIGN PATENT DOCUMENTS

CN    106501952    3/2017
CN    108415174    8/2018
CN    109389911    2/2019
(Continued)

*Primary Examiner* — Roy P Rabindranath
(74) *Attorney, Agent, or Firm* — JCIPRNET

(57) ABSTRACT

A stereoscopic display device includes a sensing device and a display device. The sensing device is suitable for sensing position information and viewing angle information of a user. The display device is connected to the sensing device and suitable for receiving the position information and the viewing angle information. The display device includes a substrate and a plurality of pixels, wherein each of the plurality of pixels includes a first sub-pixel, a second sub-pixel, and a third sub-pixel having main light-emitting directions different from each other. The display device correspondingly turns on at least one of the first sub-pixel, the second sub-pixel, and the third sub-pixel and turns off at least another of the first sub-pixel, the second sub-pixel, and the third sub-pixel based on the position information and the viewing angle information.

16 Claims, 11 Drawing Sheets

(51) Int. Cl.
*H04N 13/305* (2018.01)
*H04N 13/383* (2018.01)

(56) References Cited

U.S. PATENT DOCUMENTS

2019/0197928 A1  6/2019  Schubert et al.
2021/0405277 A1  12/2021 Brick et al.

FOREIGN PATENT DOCUMENTS

| CN | 113302551 | 8/2021 |
| CN | 113640986 | 11/2021 |
| CN | 113917699 | 1/2022 |
| CN | 115685579 | 2/2023 |
| CN | 115685580 | 2/2023 |
| KR | 101657315 | 9/2016 |
| KR | 102449685 | 9/2022 |

* cited by examiner

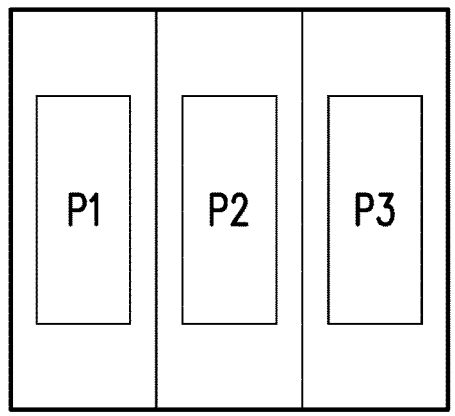
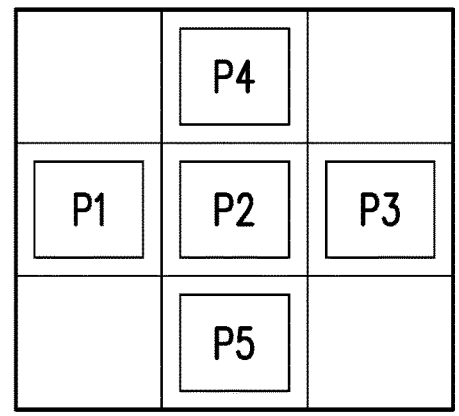
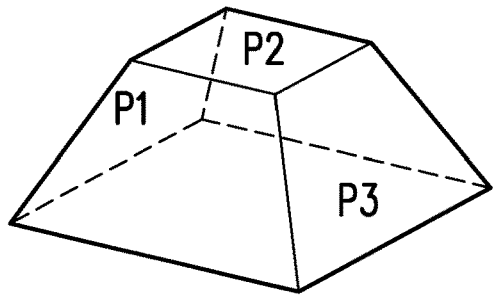
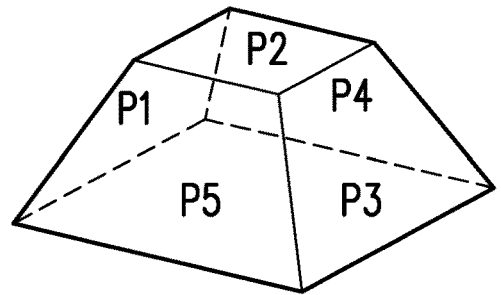
FIG. 4C    FIG. 4D
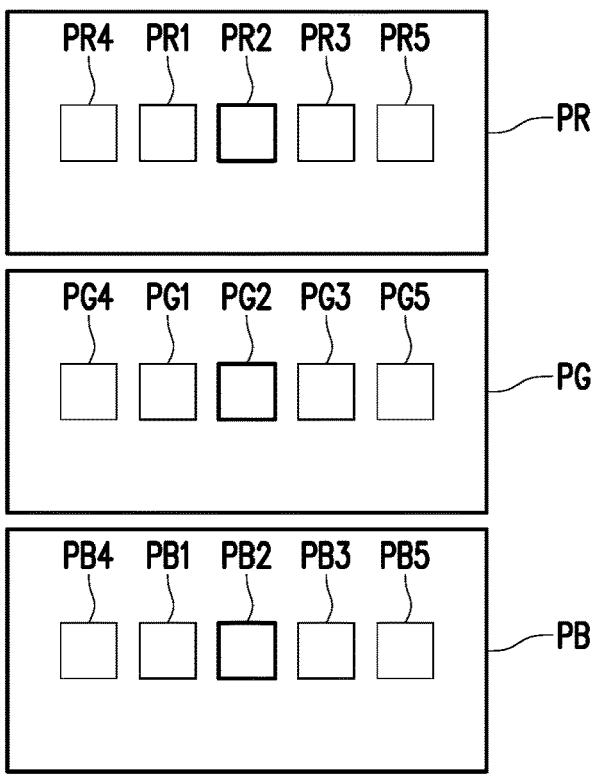
FIG. 4E

STEREOSCOPIC DISPLAY DEVICE FOR REDUCING INTERFERENCE OF STEREOSCOPIC IMAGE CROSSTALK

CROSS-REFERENCE TO RELATED APPLICATION

This application claims the priority benefit of Taiwan application serial no. 112116557, filed on May 4, 2023. The entirety of the above-mentioned patent application is hereby incorporated by reference herein and made a part of this specification.

BACKGROUND OF THE INVENTION

Field of the Invention

The invention relates to a display device, and in particular to a stereoscopic display device.

Description of Related Art

Existing stereoscopic displays include planar stereoscopic display devices and surround view displays having wrap-around planes or tri-plane tiling. However, the stereoscopic image crosstalk issue of current planar stereoscopic display devices still needs to be solved. Moreover, the tri-plane tiling surround-view display has the issue that stereoscopic images are incoherent at the tiling part with a plane, thus affecting the viewing experience of the user.

SUMMARY OF THE INVENTION

The invention provides a stereoscopic display device that may effectively improve the imaging effect of a stereoscopic image and reduce the crosstalk of the stereoscopic image.

An embodiment of the invention provides a stereoscopic display device including a sensing device and a display device. The sensing device is suitable for sensing position information and viewing angle information of a user. The display device is connected to the sensing device and suitable for receiving the position information and the viewing angle information. The display device includes a substrate and a plurality of pixels, wherein each of the plurality of pixels includes a first sub-pixel, a second sub-pixel, and a third sub-pixel having main light-emitting directions different from each other. The display device correspondingly turns on at least one of the first sub-pixel, the second sub-pixel, and the third sub-pixel and correspondingly turns off at least another of the first sub-pixel, the second sub-pixel, and the third sub-pixel based on the position information and the viewing angle information.

Based on the above, the main light-emitting direction of each of the sub-pixels of the invention has at least two or more tilt angles with respect to the plane of the substrate. In addition, the viewing angle information of the user and the position information of the user and the sensing device may be obtained via the sensing device, so as to provide the emission angle of the display device in different areas to reduce the interference of stereoscopic image crosstalk and achieve optimal stereoscopic image display effect under full-plane display.

BRIEF DESCRIPTION OF THE DRAWINGS

FIG. 4C is a top view and a side view of pixels of the display device of the first embodiment of the invention.

FIG. 4D and FIG. 4E are schematic top and side views of a modified embodiment of the pixels of the display device of the second embodiment of the invention.

DESCRIPTION OF THE EMBODIMENTS

Figure 1:
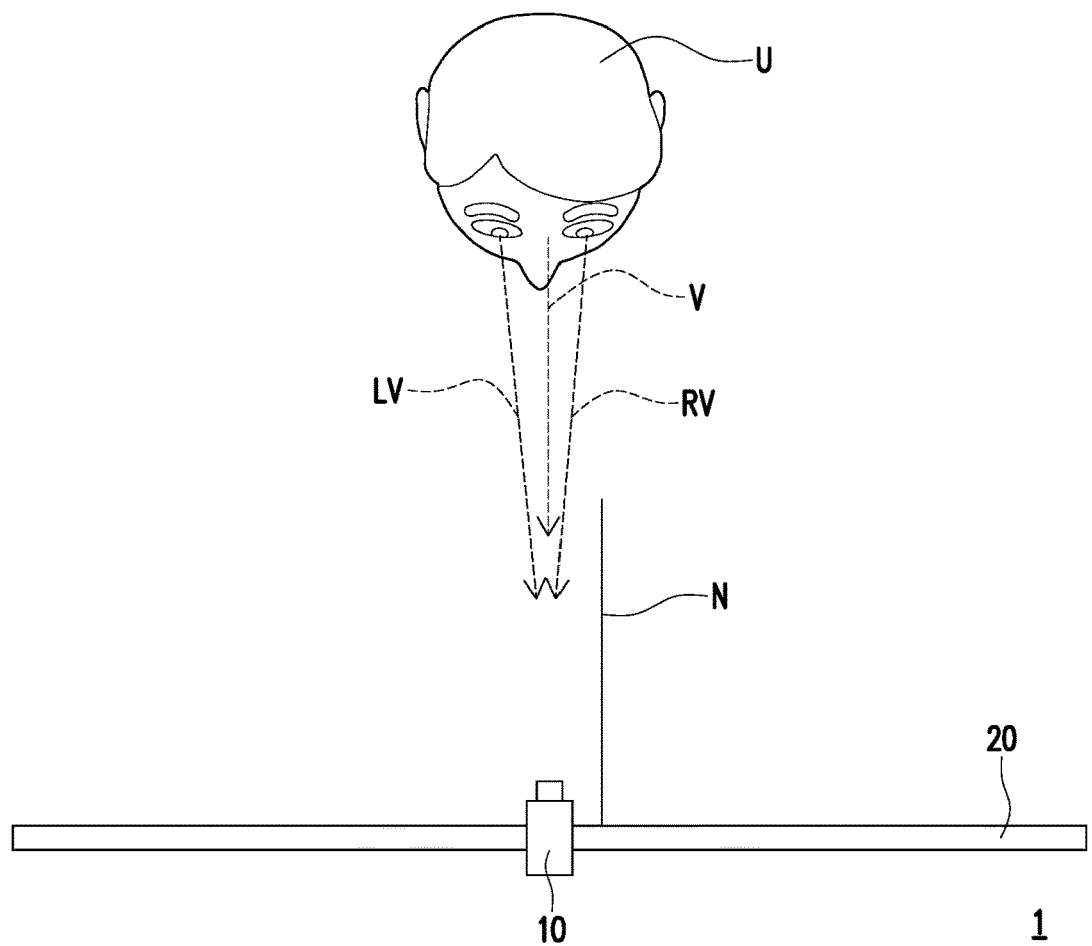
FIG. 1 is a top view of a stereoscopic display device of the first embodiment of the invention.
Figure 2A:
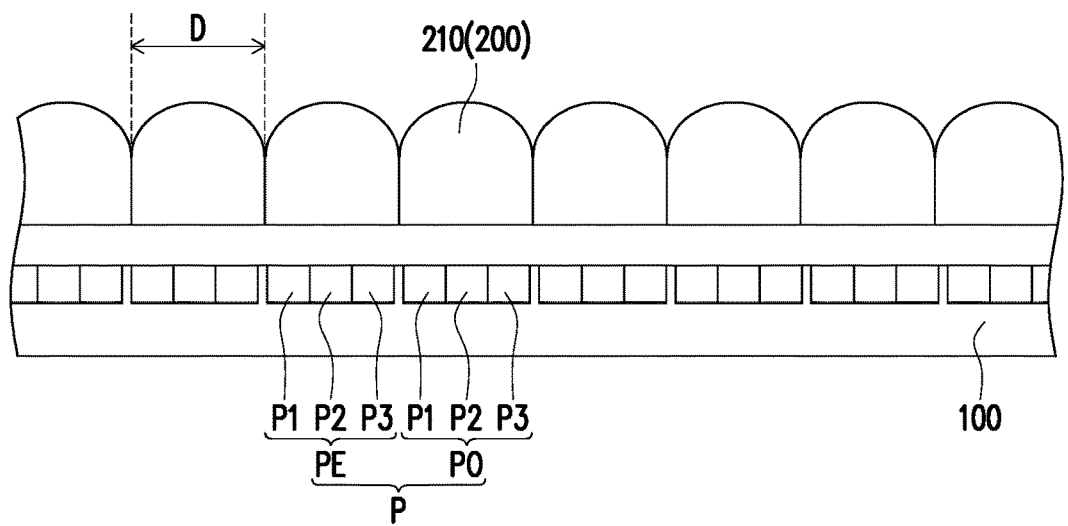
FIG. 2A is a partial cross-sectional view of the display device of the stereoscopic display device of the first embodiment of the invention.
Figure 2B:
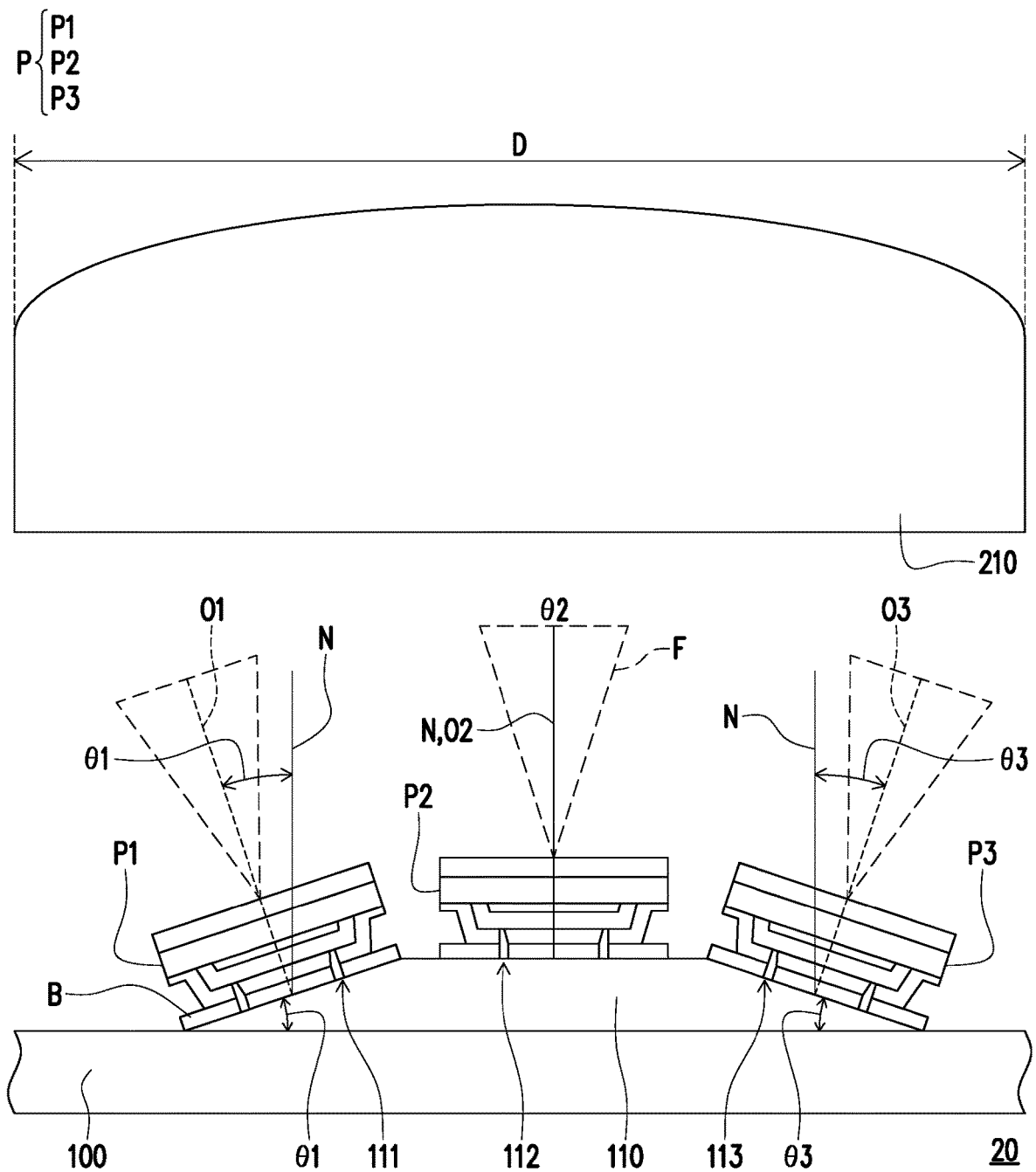
FIG. 2B is a partially enlarged cross-sectional view of the display device of FIG. 2A.

FIG. 1 is a top view of a stereoscopic display device of the first embodiment of the invention, FIG. 2A is a partial cross-sectional view of the display device of the stereoscopic display device of the first embodiment of the invention, and FIG. 2B is a partially enlarged cross-sectional view of the display device of FIG. 2A. Please refer to FIG. 1 to FIG. 2B at the same time. A stereoscopic display device 1 of the invention includes a sensing device 10 and a display device 20. The display device 20 includes a substrate 100, a lenticular lens array 200, and a plurality of pixels P, wherein each of the pixels P of the plurality of pixels P includes a first sub-pixel P1, a second sub-pixel P2, and a third sub-pixel P3.

The detection device 10 includes a user tracking device. In particular, the user tracking device may be a stereo camera, an infrared stereo depth image camera, an optical detector, an acoustic detector, an ultrasonic detector, etc. that may detect the image depth device of a user U. For example, the user tracking device may detect the eyeball position of the user U to detect a viewing angle V of the user U and the distance between the user U and the detection device 10 or the direction relative to the detection device 10, and convert the above information into position information and viewing angle information to be transmitted to a computing unit and a processor (not shown) of the display device 20. The processor then controls a driving chip (not shown) of the display device 20 to send a corresponding display signal to control the first sub-pixel P1, the second sub-pixel P2, and the third sub-pixel P3 of each of the pixels P to be turned on or off (described later).

The display device 20 is, for example, a liquid-crystal display device (LCD) or a self-light-emitting display. A light-emitting element of the self-light-emitting display may be an element such as a micro light-emitting diode (μLED) and an organic light-emitting diode (OLED); the μLED may be a variation design of a basic material such as gallium arsenide (GaAs), aluminum phosphide (AlP), and gallium nitride (GaN). The OLED may be a variation design of a basic material such as phosphorescent material, thermally-activated delayed fluorescent material (TADF material), or fluorescent material.

The substrate 100 may include a plurality of signal lines (such as data lines, scan lines, or power lines). Moreover, an example includes a driving substrate adopting silicon wafer material and including complementary metal oxide semiconductor (CMOS) to improve the response speed of each switch element in the substrate 100 and reduce power consumption to meet the demands of fast response and high resolution of the display device 20. However, the invention is not limited thereto. In other embodiments, the substrate 100 may also be a combination of a glass substrate and a pixel circuit layer, wherein the pixel circuit layer is formed on the glass substrate using a semiconductor process, and the pixel circuit layer may include an active element (such as thin-film transistor) and various signal lines (such as data lines, scan lines, or power lines), but not limited thereto.

The lenticular lens array 200 includes a plurality of lenticular lenses 210. The plurality of lenticular lenses 210 may allow the image light emitted by odd-numbered pixels PO and even-numbered pixels PE in the plurality of pixels P to be refracted by the plurality of lenticular lenses 210, so that the independent image lights emitted by the plurality of odd-numbered pixels PO and the plurality of even-numbered pixels PE respectively enter the left eye and the right eye of the user U, so that the user U may generate stereoscopic image vision. In particular, the material of the lenticular lenses 210 may include glass, quartz, or plastic material, etc., and the invention is not limited thereto.

The first sub-pixel P1, the second sub-pixel P2, and the third sub-pixel P3 in the plurality of pixels P may be respectively disposed corresponding to the pixel circuit layer, the active element, and various signal lines. Moreover, the first sub-pixel P1, the second sub-pixel P2, and the third sub-pixel P3 in FIG. 2B adopt self-illuminating μLEDs as an exemplary illustration. However, the invention is not limited thereto. In other embodiments, OLEDs may also be adopted as the light-emitting elements of the first sub-pixel P1, the second sub-pixel P2, and the third sub-pixel P3. In other embodiments, the first sub-pixel P1, the second sub-pixel P2, and the third sub-pixel P3 may also adopt non-self-illuminating liquid-crystal displays, and have corresponding liquid-crystal layer, pixel electrode, and common electrode etc. (described later), and the invention is not limited thereto.

It is worth mentioning that, compared with conventional stereoscopic displays, the light-emitting directions of the pixels on the same display surface are substantially consistent. The light-emitting directions of the first sub-pixel P1, the second sub-pixel P2, and the third sub-pixel P3 of each of the pixels P of the stereoscopic display device 1 of the invention are different from each other. Furthermore, the main light-emitting directions of the first sub-pixel P1, the second sub-pixel P2, and the third sub-pixel P3 are diverged from each other. It may also be understood that the light-emitting direction of each of the sub-pixels of the invention has at least two or more tilt angles with respect to the plane of the substrate 100.

Please refer to FIG. 2B, the display device 20 further includes a base 110. The first sub-pixel P1, the second sub-pixel P2, and the third sub-pixel P3 may be disposed on the substrate 100 via the base 110. In particular, the base 110 has a first slope 111, a second slope 112, and a third slope 113, there is a first angle $\theta 1$ between the first slope 111 and the plane of the substrate 100, there is a second angle $\theta 2$ between the second slope 112 and the plane of the substrate 100, and there is a third angle $\theta 3$ between the third slope 113 and the plane of the substrate 100. Further, the first sub-pixel P1, the second sub-pixel P2, and the third sub-pixel P3 are respectively disposed on the first slope 111, the second slope 112, and the third slope 113. The light-emitting surface of the light-emitting element of the first sub-pixel P1 may be substantially parallel to the first slope 111, so that the included angle between a main light-emitting direction O1 and a normal N of the substrate 100 is the first angle $\theta 1$. The light-emitting surface of the light-emitting element of the second sub-pixel P2 may be substantially parallel to the second slope 112, so that the included angle between a main light-emitting direction O2 and the normal N of the substrate 100 is the second angle $\theta 2$. The light-emitting surface of the light-emitting element of the third sub-pixel P3 may be substantially parallel to the third slope 113, so that the included angle between a main light-emitting direction O3 and the normal N of the substrate 100 is the third angle $\theta 3$. Therefore, the main light-emitting direction O1, the main light-emitting direction O2, and the main light-emitting direction O3 may be diverged from each other. In FIG. 2B, the second angle $\theta 2$ is substantially 0 degrees as an exemplary illustration, so the main light-emitting direction O2 of the second sub-pixel P2 is substantially coincided with the normal N. Moreover, if the light-emitting element adopts a non-parallel light source, the light emission of each of the first sub-pixel P1, the second sub-pixel P2, and the third sub-pixel P3 has a light-emitting range F. Therefore, the main light-emitting directions (such as the main light-emitting direction O1, the main light-emitting direction O2, and the main light-emitting direction O3) here may refer to the central axis of the light-emitting range F of each of the sub-pixels or the light-emitting direction having the highest light intensity.

The base 110 may include a pad B, a circuit structure, and a switch element (not shown), and is made of an insulating material as a base material. An electrical signal is transmitted to the pad B on each of the slopes (such as the first slope 111, the second slope 112, and the third slope 113) on the base 110 via a drive circuit on the substrate 100 to drive and independently control each of the light-emitting elements of the first sub-pixel P1, the second sub-pixel P2, and the third sub-pixel P3 on the base 110. Each of the light-emitting elements of the first sub-pixel P1, the second sub-pixel P2, and the third sub-pixel P3 may be disposed on the first slope 111, the second slope 112, and the third slope 113 on the base 110 via a mass transfer technique via, for example, an electrostatic transfer method, a micro transfer printing method, or a fluid assembly method. Of course, the invention is not limited thereto.

It should be noted that the embodiments of the invention are described with the second sub-pixel P2 disposed between the first sub-pixel P1 and the third sub-pixel P3. Moreover, there is the first angle $\theta 1$ between the main light-emitting direction O1 and the normal N of the substrate 100, there is the second angle $\theta 2$ between the main light-emitting direction O2 and the normal N, and there is the third angle $\theta 3$ between the main light-emitting direction O3 and the normal N, wherein the size of $\theta 1$, $\theta 2$, and $\theta 3$ may satisfy the following relationship: $\theta 1 = \theta 2 + k(x)*a$; $\theta 3 = \theta 2 + k(x)*a$, wherein a is a positive integer determined according to the actual design, and k(x) is a variable equation corresponding to displays having different resolutions. For example, for some displays, k(x)=2*arctan(D/2f), wherein D is the pitch of the plurality of lenticular lenses 210 in the lenticular lens array 200, and f is the focal length of the lenticular lenses 210. The design of θ1, θ2, and θ3 is described below.

Figure 3A:
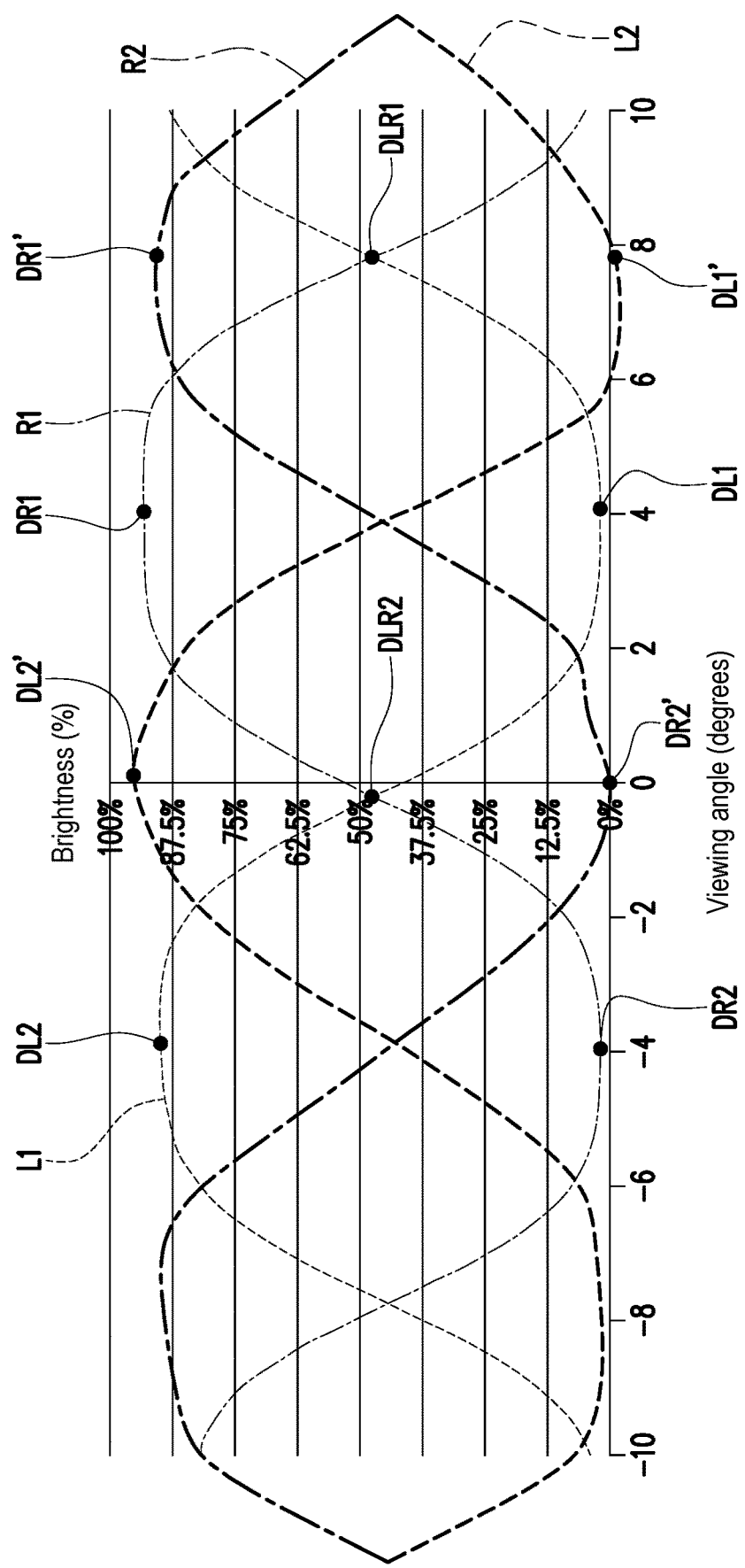
FIG. 3A is a view of optimal visual angles of the left and right eyes under different tilt angles when the user is about 30 cm away from the stereoscopic display and viewing a 10.1-inch or 31.5-inch stereoscopic display.

FIG. 3A is a view of optimal visual angles of the left and right eyes under different tilt angles when the user is about 30 cm away from the stereoscopic display and viewing a 10.1-inch or 31.5-inch stereoscopic display. In particular, R1 represents the graph of optimal visual angle that the user U perceives from the right pixels when the user U is in the center of the display device and looks straight at the display device. Similarly, L1 represents the graph of optimal visual angle that the user U perceives from the left pixels when the user U is in the center of the display device.

Please refer to FIG. 1 and FIG. 3A at the same time. For example, it may be known from the conditions of FIG. 3A drawn from the above experimental data that when the viewing angle of the right eye is 4 degrees (for example, the included angle between a line of sight RV of the right eye and the normal N in FIG. 1 is 4 degrees), at this time, the image brightness from the display pixels on the right received by the right eye is the maximum value (as shown in point DR1 in FIG. 3A). At the same time, the image brightness from the left display pixels received by the right eye is the minimum value (for example, point DL1 in FIG. 3A). Therefore, the right eye may receive clear image information from the pixels on the right with minimal interference from the pixels on the left. On the other hand, when the viewing angle of the left eye is −4 degrees (for example, the included angle between a line of sight LV of the left eye and the normal N in FIG. 1 is −4 degrees), at this time, the brightness from the left display pixels received by the left eye is the maximum value (such as point DL2 in FIG. 3A), and the brightness from the right pixels received by the left eye is the minimum value (such as point DR2 in FIG. 3A). Therefore, the left eye may receive clear image information from the pixels on the left with minimal interference from the pixels on the right. Accordingly, the right and left eyes of the user U may receive a clear image from the right pixels and a clear image from the left pixels respectively, and the independent image information (for example, the independent image information of the same object under different viewing angles) is transmitted via the right pixels and the left pixels respectively, so that the user U may generate a clear stereoscopic image.

However, when there is a slight deviation between the viewing angle or the position of the user U and the display device 20, for example, when the viewing angle V of the person in FIG. 1 is shifted by 4 degrees to the right of the normal N of the display device 20, at this time, the viewing angle of the right eye is substantially 8 degrees, and the right eye receives the right pixel image and the left pixel image with nearly equal brightness (for example, point DLR1 in FIG. 3A); and at this time, the viewing angle of the left eye is substantially 0 degrees, and the left eye also receives the right pixel image and the left pixel image with nearly equal brightness (such as point DLR2 in FIG. 3A). Accordingly, the user U experiences the issue of stereoscopic crosstalk, thus affecting the viewing experience of the user U.

In FIG. 3A, R2 represents when the user U is in the center of the display device of the present embodiment and looks directly at the display device 20 (that is, the midpoint of the interpupillary distance of the user U faces the display device 20 at this time), and the user U perceives the curve of optimal viewing angle from the right sub-pixel (e.g., the third sub-pixel P3 in FIG. 2B). L2 represents when the user U is in the center of the display device 20 of the present embodiment and looks directly at the display device 20 (that is, the midpoint of the interpupillary distance of the user U faces the display device 20 at this time), and the user U perceives the curve of optimal viewing angle from the left sub-pixel (e.g., the first sub-pixel P1 in FIG. 2B). As may be seen from FIG. 3A, via the design of the present embodiment, even if the viewing angle V of the person is shifted by 4 degrees to the right of the normal N of the display device 20, the viewing angle of the right eye is substantially 8 degrees at this time, and the image brightness from the right sub-pixel received by the right eye is the maximum value (such as point DR1' in FIG. 3A), and at the same time, the image brightness of the left sub-pixel received by the right eye is the minimum value (such as point DL1' in FIG. 3A). Therefore, the right eye may receive clear image information from the sub-pixels on the right with minimal interference from the sub-pixels on the left. On the other hand, at this time, the viewing angle of the left eye is 0 degrees, and the brightness from the left sub-pixel received by the left eye is the maximum value (as shown in point DL2' in FIG. 3A), and the brightness from the right sub-pixel received by the left eye is the minimum value (as shown in point DR2' in FIG. 3A). Therefore, the left eye may receive clear image information from the display pixels of the left sub-pixel with minimal interference from the right sub-pixel. Moreover, when the user is located at the normal viewing angle of the display device 20 (for example, the viewing angle is 0 degrees), the first sub-pixel P1 and the third sub-pixel P3 do not need to be turned on, and only the second sub-pixel P2 of one of the plurality of pixels P is turned on to the eye of the user U (for example, the left eye), and the second sub-pixel P2 of another of the plurality of pixels P is turned on to another eye (for example, the right eye) of the user U. Accordingly, the display device 20 may also avoid the issue of stereoscopic crosstalk, and achieve optimal stereoscopic presentation.

Based on the above, the stereoscopic display device 1 of the invention allows the right eye and the left eye of the user U to receive a clear image from the right pixels and a clear image from the left pixels, respectively. The eyeball position and the viewing angle of the user U may also be tracked via the detection device 10 to obtain the position information and the viewing angle information, and correspondingly turn on two of the first sub-pixel P1, the second sub-pixel P2, and the third sub-pixel P3 and turn off at least another of the first sub-pixel P1, the second sub-pixel P2, and the third sub-pixel P3, so as to adjust the optimal brightness of the left and right eyes to achieve optimized stereoscopic vision presentation, so as to effectively reduce stereoscopic image crosstalk, so that a good stereoscopic image may be viewed.

It should be noted that the constant 4 degrees is only an exemplary numerical value. In actuality, this value is changed by the pixel size and pixel pitch of the display and the distance from the user U to the display device 20. In other words, in other embodiments, the above value of 4 degrees is actually a function of k(x), and the variables affecting k(x) include the pitch of the lenticular lenses 210 in the lenticular lens array 200 and the focal length of the lenticular lenses 210. Specifically, the size of θ1, θ2, and θ3 may further satisfy the following relationship: θ1=θ2+k(x)*a; θ3=θ2+k(x)*a, wherein k(x)=2*arctan(D/2f). In particular, D is the pitch between the lenticular lenses 210 in the lenticular lens array 200, f is the focal length of the lenticular lenses 210, and a is a positive integer determined according to the actual design.

Moreover, in a stereoscopic display or a general flat-panel display, due to factors such as light leakage in the dark state of the side viewing angle or decrease in brightness in the bright state, when the user views at a large viewing angle, issues such as stereoscopic image crosstalk and reduced image contrast occur. Therefore, poor viewing quality results.

Figure 3B:
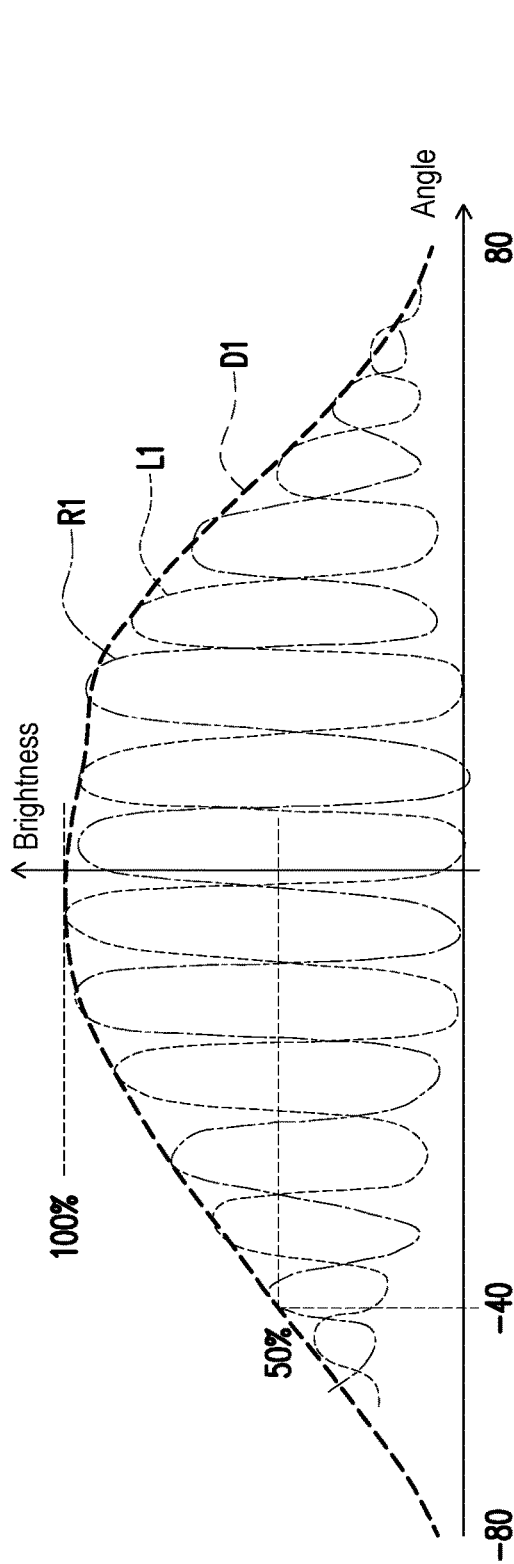
FIG. 3B is a brightness distribution diagram of a stereoscopic display under different viewing angles.
Figure 3C:
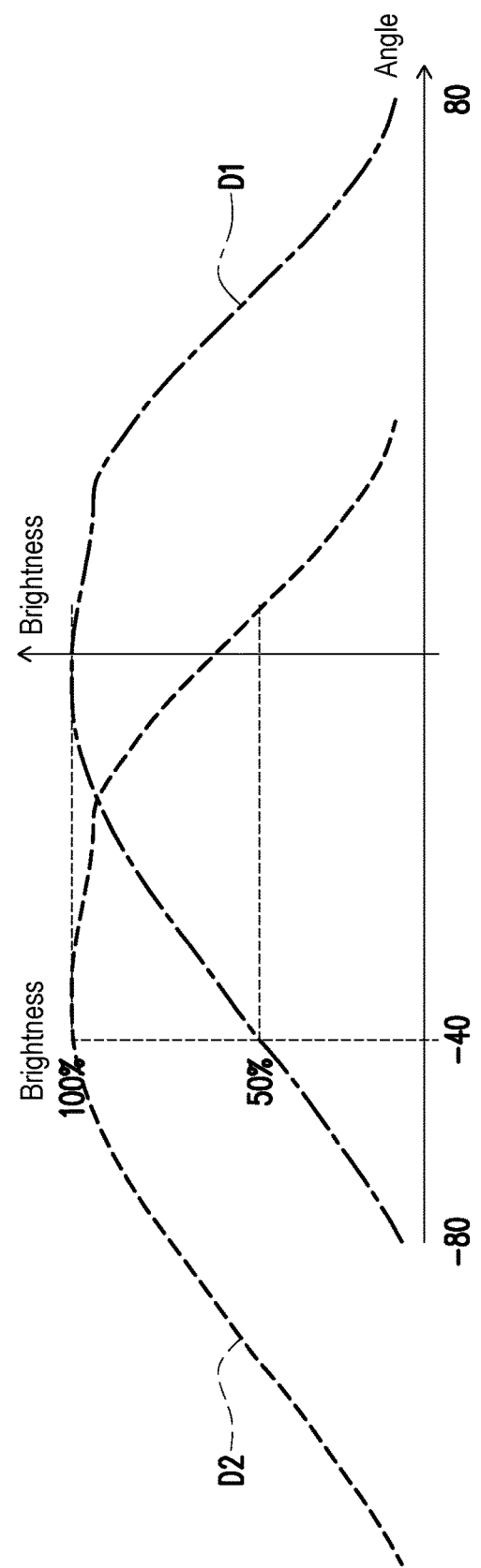
FIG. 3C is a brightness distribution diagram of a stereoscopic display with different planes under different viewing angles.

For example, FIG. 3B is a brightness distribution diagram of a stereoscopic display under different viewing angles. FIG. 3C is a brightness distribution diagram of a stereoscopic display with different planes under different viewing angles. As may be seen from FIG. 3B, when the viewing angle of the human eyes is a normal viewing angle or a small viewing angle, a brightness D1 of the display viewed by the left and right eyes may be maintained at nearly 100% of the display brightness. However, when the display is viewed at a large viewing angle or the surrounding images of the display are viewed with peripheral vision (e.g., −40 degrees), the brightness D1 of the display observed by the human eyes is dropped to about 50% of the maximum brightness. It may be seen from FIG. 3C that, when the human eyes view a display in the tiling display or view the peripheral image of a display with peripheral vision, the issue that the brightness D1 of the display is dropped (for example, the brightness is about 50% of the maximum brightness when the viewing angle is −40 degrees) is experienced. However, a display brightness D2 provided by another display in the tiling display is 100%, thus causing issues such as discontinuous display images of different display surfaces at the tiling part when the user views the tiling display.

Some other examples are listed below to illustrate the invention in detail. In particular, the same components are marked with the same reference numerals, and descriptions of the same technical content is omitted. For the omitted parts, please refer to the above embodiments, which are not repeated hereafter.

Figure 4A:
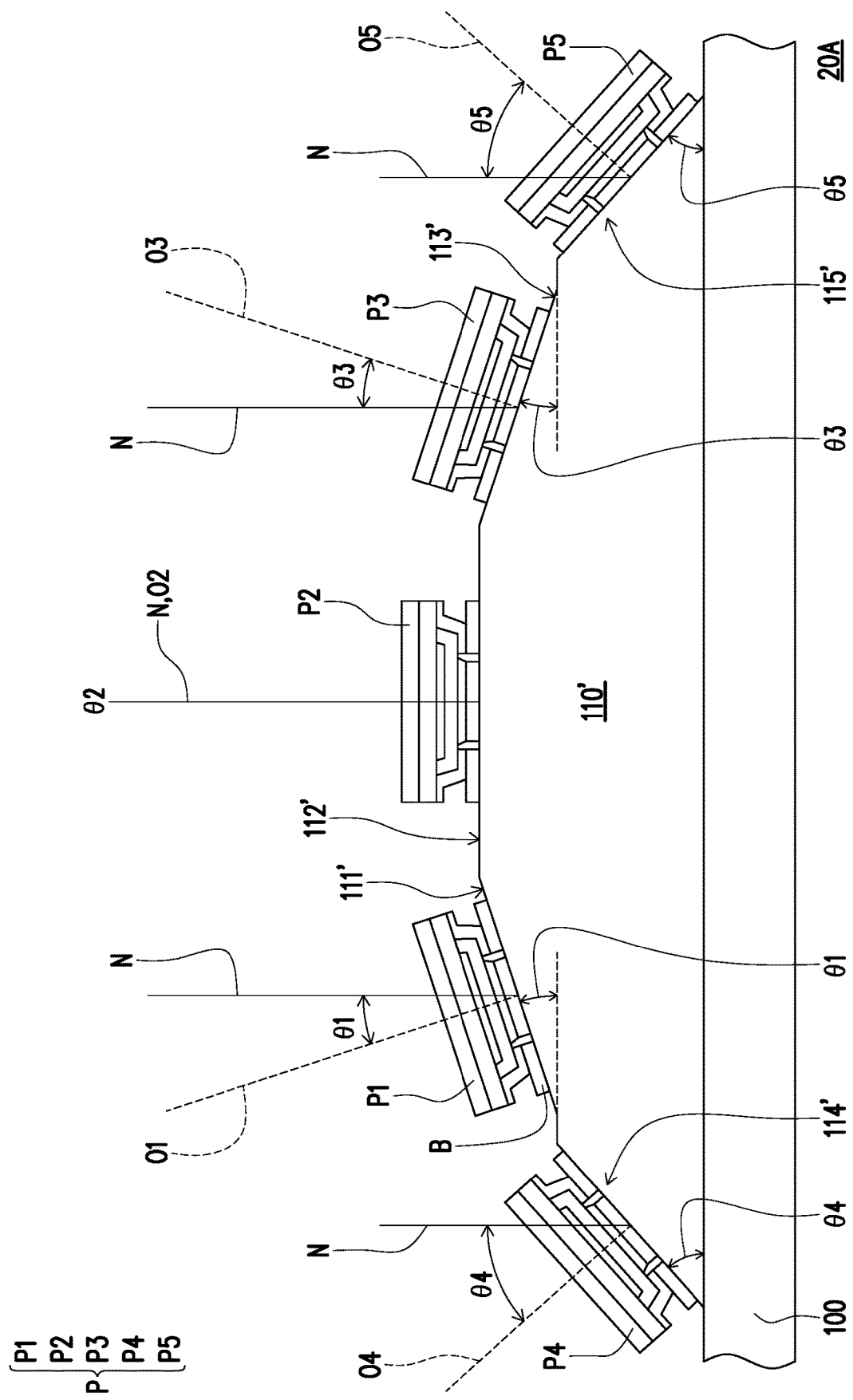
FIG. 4A is a partially enlarged cross-sectional view of a display device of the second embodiment of the invention.

FIG. 4A is a partially enlarged cross-sectional view of the display device of the second embodiment of the invention. Referring to FIG. 4A, a display device 20A of the present embodiment is similar to the display device 20 in FIG. 2B, and the difference is that a base 110' of the display device 20A is different and the configuration of each of the sub-pixels is different. In detail, the base 110' also includes a fourth slope 114' and a fifth slope 115' respectively located at two sides of the second slope 112. There is a fourth angle θ4 between the fourth slope 114' and the plane of the substrate 100, and there is a fifth angle θ5 between the fifth slope 115' and the plane of the substrate 100, wherein θ4=θ5, θ4>θ1, and θ4>θ3. In addition, the pixels P further include a fourth sub-pixel P4 and a fifth sub-pixel P5 respectively disposed on the fourth slope 114' and the fifth slope 115'. In addition, the light-emitting directions of the first sub-pixel P1, the second sub-pixel P2, the third sub-pixel P3, the fourth sub-pixel P4, and the fifth sub-pixel P5 are different from each other.

For example, since the included angle between the fourth slope 114' and the substrate 100 is the fourth angle θ4, the light-emitting surface of the light-emitting element of the fourth sub-pixel P4 may be substantially parallel to the fourth slope 114'. Therefore, the included angle between the main light-emitting direction O4 of the fourth angle θ4 and the normal N of the substrate 100 is substantially the fourth angle θ4. Similarly, since the included angle between the fifth slope 115' and the substrate 100 is the fifth angle θ5, the light-emitting surface of the light-emitting element of the fifth sub-pixel P5 may be substantially parallel to the fifth slope 115'. Therefore, the included angle between the main light-emitting direction O5 of the fifth angle θ5 and the normal N of the substrate 100 is substantially the fifth angle θ5. The fourth sub-pixel P4 and the fifth sub-pixel P5 may adopt the same light-emitting element (such as μLED or OLED) and bonding method as the first sub-pixel P1, the second sub-pixel P2, or the third sub-pixel P3, and the invention is not limited thereto. Accordingly, the main light-emitting directions of the first sub-pixel P1, the second sub-pixel P2, the third sub-pixel P3, the fourth sub-pixel P4, and the fifth sub-pixel P5 may be diverged from each other. Furthermore, the fourth angle θ4 and the fifth angle θ5 may be angles corresponding to a large decrease in brightness of the display device under a large viewing angle. For example, θ4 and θ5 may be substantially 40 degrees.

Figure 4B:
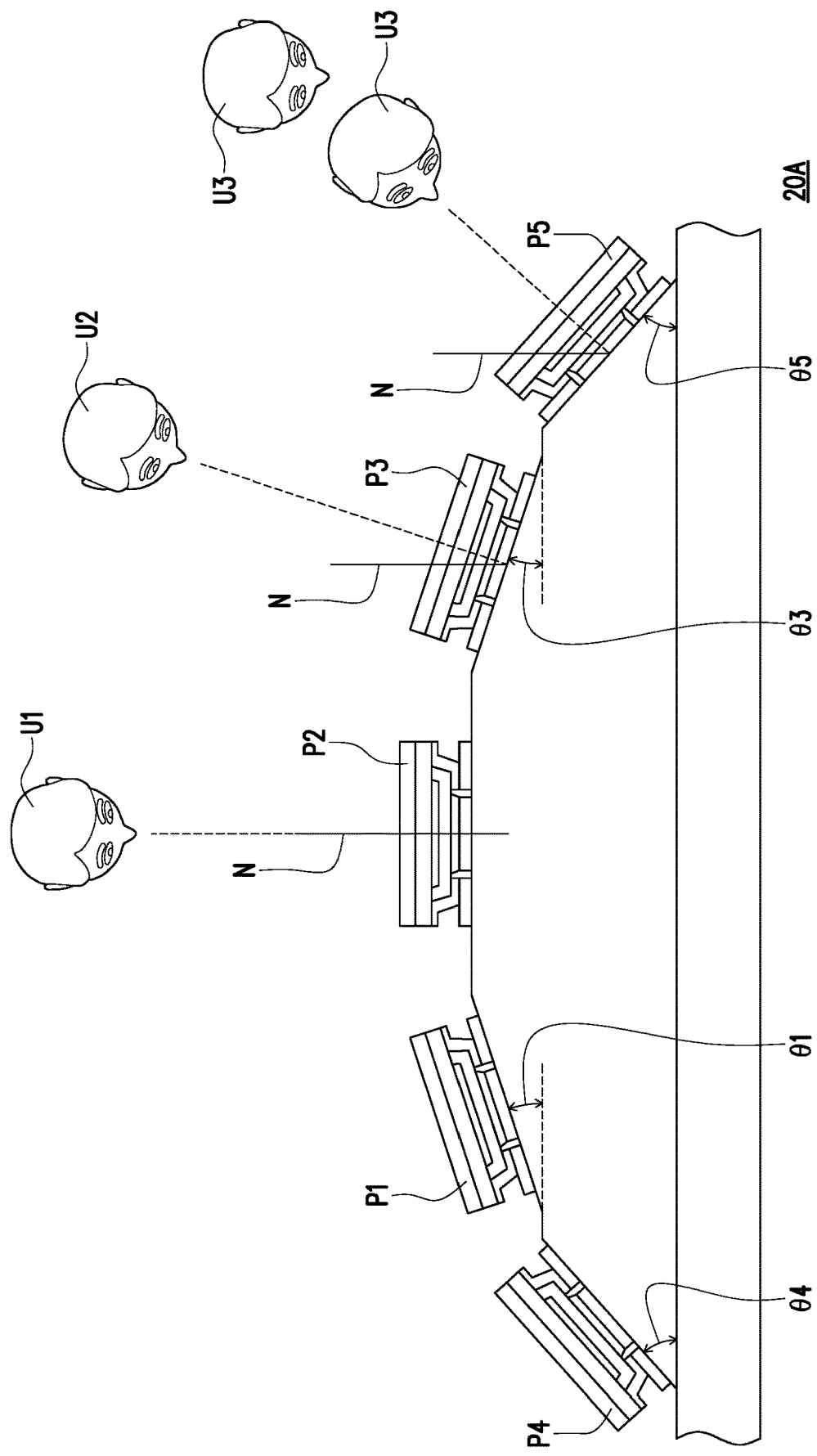
FIG. 4B is a schematic diagram of the working principle of the display device of the second embodiment of the invention for a user at different positions and viewing angles.

FIG. 4B is a schematic diagram of the working principle of the display device of the second embodiment of the invention for a user at different positions and viewing angles. Please refer to FIG. 4B, the detection device 10 may detect the viewing angle information and the distance information of the user at different positions (such as a user U1, a user U2, a user U3), and transmit the above information to the display device 20A to correspondingly turn on each of the sub-pixels to achieve the effect of optimizing the left and right viewing angles, so as to alleviate the issues of stereoscopic image crosstalk and contrast reduction. For example, when the line of sight of the user U1 is substantially parallel to the normal N of the substrate 100, the display device 20A may turn on only the second sub-pixel P2 in the plurality of pixels P, so as to provide image information of the user U1 with a normal viewing angle. When the included angle between the line of sight of the user U2 and the normal N of the substrate 100 is between 2 degrees and θ5, only one of the first sub-pixel P1 and the third sub-pixel P3 in the plurality of pixels P needs to be turned on. It should be noted that in FIG. 4B, since the user U2 is located at the right side of the display device 20A, the third sub-pixel P3 is selected to be turned on. Conversely, when the user U2 is located at the left side of the display device 20A, they may choose to turn on only the first sub-pixel P1. Moreover, when the included angle between the line of sight of the user U3 and the normal N of the substrate 100 is greater than θ5, only one of the fourth sub-pixel P4 and the fifth sub-pixel P5 of the plurality of pixels P needs to be turned on. Similarly, it should be noted that in FIG. 4B, since the user U3 is located at the right side of the display device 20A, the fifth sub-pixel P5 is selected to be turned on. Conversely, when the user U3 is located at the left side of the display device 20A, they may choose to turn on only the fourth sub-pixel P4.

Accordingly, another group of sub-pixels of the display device 20A (such as the first sub-pixel P1, the second sub-pixel P2, the third sub-pixel P3, the fourth sub-pixel P4, and the fifth sub-pixel P5) may provide another independent image information to different eyes of the user with respect to the position and the viewing angle of the user U1, the user U2, or the user U3. In this way, image information independent from each other may be provided to different eyes of the user to achieve a stereoscopic image. For the methods of turning on and off corresponding to each of the sub-pixels, reference may be made to the above paragraphs, which are not repeated here.

Accordingly, when the user is at different positions and viewing angles, the display device 20A may correspondingly turn on and adjust suitable sub-pixels to solve issues such as contrast reduction and stereoscopic optical crosstalk of the display device of FIG. 3B when viewed at a large viewing angle, in order to achieve the optimal stereoscopic display effect of the display device 20A under large left and right viewing angles.

FIG. 4C is a top view and a side view of pixels of the display device of the first embodiment of the invention. FIG. 4D and FIG. 4E are schematic top and side views of a modified embodiment of the pixels of the display device of the second embodiment of the invention. It may be seen from FIG. 4C that the pixels P of the display device 20 may adopt a trapezoidal stereoscopic structure design (such as the base 110), and the first sub-pixel P1, the second sub-pixel P2, and the third sub-pixel P3 may be respectively disposed on three planes connected in a trapezoidal structure. Moreover, the pixels P of the display device 20A may also adopt the design shown in FIG. 4D, the fourth sub-pixel P4 and the fifth sub-pixel P5 may be respectively disposed at two opposite sides of the second sub-pixel P2, the first sub-pixel P1 and the third sub-pixel P3 are respectively disposed on another two opposite sides of the second sub-pixel P2, and the first sub-pixel P1, the third sub-pixel P3, the fourth sub-pixel P4, and the fifth sub-pixel P5 are disposed around the second sub-pixel P2, but the invention is not limited thereto.

In addition, the wavelengths of the light beams emitted by the first sub-pixel P1, the second sub-pixel P2, the third sub-pixel P3, the fourth sub-pixel P4, and the fifth sub-pixel P5 are substantially the same. For example, as shown in FIG. 4E for a pixel PR for emitting red light, a first sub-pixel PR1, a second sub-pixel PR2, a third sub-pixel PR3, a fourth sub-pixel PR4, and a fifth sub-pixel PR5 thereof may all be red μLEDs; for a pixel PG for emitting green light, a first sub-pixel PG1, a second sub-pixel PG2, a third sub-pixel PG3, a fourth sub-pixel PG4, and a fifth sub-pixel PG5 thereof may all be green μLEDs; for a pixel PB for emitting blue light, a first sub-pixel PB1, a second sub-pixel PB2, a third sub-pixel PB3, a fourth sub-pixel PB4, and a fifth sub-pixel PB5 thereof may all be blue μLEDs. Accordingly, the display device 20A of the invention may implement color stereoscopic display of images. Of course, the design that each of the sub-pixels in the pixels of different colors has the same color may also be applied to the display device 20, such that the display device 20 may also implement color stereoscopic display of images, but the invention is not limited thereto.

Figure 5A:
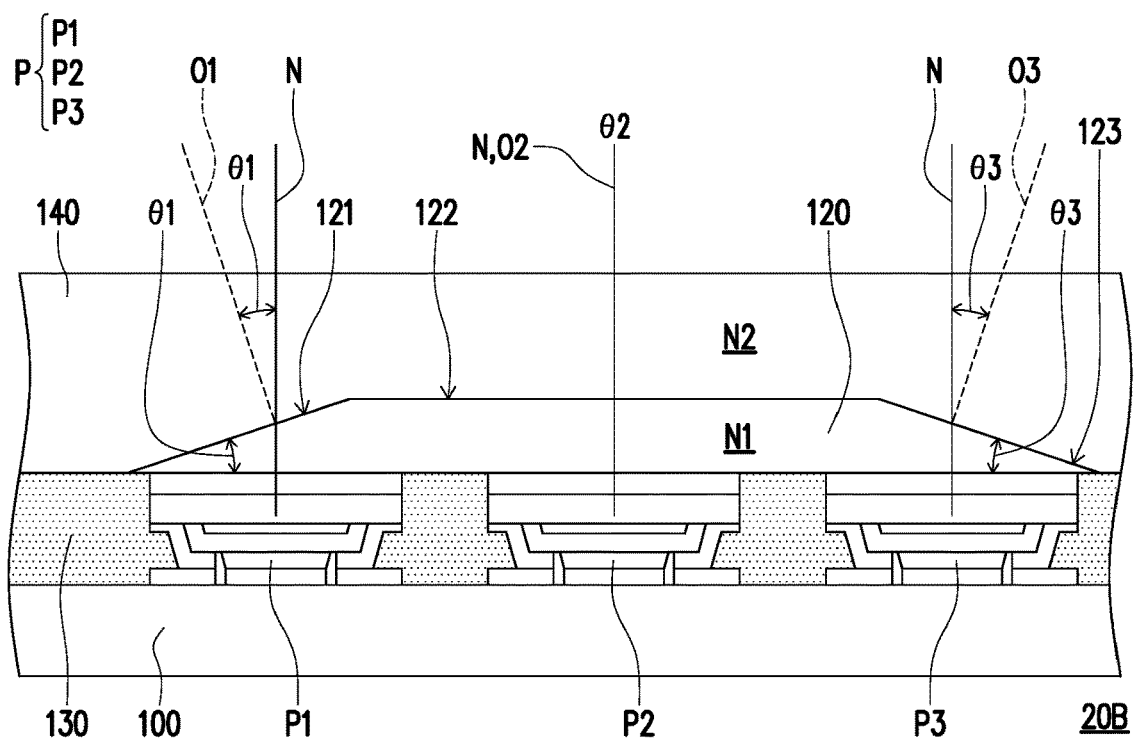
FIG. 5A is a partially enlarged cross-sectional view of a display device of the third embodiment of the invention.

FIG. 5A is a partially enlarged cross-sectional view of the display device of the third embodiment of the invention. Referring to FIG. 5A, a display device 20B of the present embodiment is similar to the display device 20 in FIG. 2B, and the main difference thereof is in the display device 20B, the means for making the light-emitting directions of the sub-pixels different from each other are different.

In detail, the display device 20B includes an optical path adjusting element 120, and the pixels P are disposed between the optical path adjusting element 120 and the substrate 100, and each of the sub-pixels in the pixels P (such as the first sub-pixel P1, the second sub-pixel P2, and the third sub-pixel P3) may be directly electrically connected on the substrate 100. Furthermore, the optical path adjusting element 120 has the first slope 121, the second slope 122, and the third slope 123, there is the first angle θ1 between the first slope 121 and the light-emitting surface of the first sub-pixel P1, the second slope 122 is located between the first slope 121 and the third slope 123, and there is the third angle θ3 between the third slope 123 and the light-emitting surface of the third sub-pixel P3. Since the second slope 122 may be substantially parallel to the substrate 100, the second slope 122 is drawn here in such a way that the main light-emitting direction θ2 is coincided with the normal N, that is, the second angle θ2 is substantially 0 degrees. However, the invention is not limited thereto.

The optical path adjusting element 120 may be, for example, a refraction element having a suitable refractive index N1 that may change the first sub-pixel P1, the second sub-pixel P2, and the third sub-pixel P3 being located in the same light-emitting surface of the same plane in the same light-emitting direction to the main light-emitting direction O1 and the normal N of the substrate 100 having the first angle θ1, the main light-emitting direction O2 and the normal N of the substrate 100 being substantially parallel, and the main light-emitting direction O3 and the normal N of the substrate 100 having the third angle θ3 via the optical path adjusting element 120. In this way, the display device 20B may also achieve a similar effect to the display device 20 to effectively reduce optical crosstalk to present good stereoscopic images.

In addition, the display device 20B may include an insulating material 130 disposed between the plurality of pixels P. Further, the insulating material 130 may also be disposed between the first sub-pixel P1, the second sub-pixel P2, and the third sub-pixel P3. The insulating material 130 may be formed by, for example, curing a photoresist material, or plastic or optically transparent adhesive, etc., to increase the firmness between the first sub-pixel P1, the second sub-pixel P2, and the third sub-pixel P3 and the substrate 100 to fix the positions of the sub-pixels to increase the reliability of the overall display device 20. In other embodiments, the insulating material 130 may also be doped with other light-absorbing particles or be a light-absorbing material to absorb the light emitted by the first sub-pixel P1, the second sub-pixel P2, and the third sub-pixel P3 towards the non-display direction. Alternatively, the ambient light from the outside may be absorbed, and of course the above two kinds of light may also be absorbed simultaneously to reduce the optical crosstalk of the display image and further increase the contrast of the display device 20, and the invention is not limited thereto.

Moreover, the display device 20B may further include a light-transmitting layer 140 disposed on the optical path adjusting element 120. Furthermore, the light-transmitting layer 140 may be directly in contact with and cover the optical path adjusting element 120 and the insulating material 130. The optical path adjusting element 120 is disposed between the light-transmitting layer 140 and the first sub-pixel P1, the second sub-pixel P2, and the third sub-pixel P3. Moreover, a refractive index N2 of the light-transmitting layer 140 is different from the refractive index N1 of the optical path adjusting element 120. Accordingly, the light-emitting angle of each of the sub-pixels may be controlled by adjusting the refraction effect via the optical path adjusting element 120 and the light-transmitting layer 140, such that there is the first angle θ1 between the main light-emitting direction O1 of the first sub-pixel P1 and the normal N of the substrate 100, such that there is the second angle θ2 between the main light-emitting direction O2 of the second sub-pixel P2 and the normal N of the substrate 100, and such that there is the third angle θ3 between the main light-emitting direction O3 of the third sub-pixel P3 and the normal N of the substrate 100. By changing the material of the light-transmitting layer 140 to adjust the refractive index N2, a suitable light-emitting direction is readily designed to achieve optimal stereoscopic display effect of the display device 20B. If the optical path adjusting element 120 is in direct contact with the light-transmitting layer 140, so that there is no other medium between the optical path adjusting element 120 and the light-transmitting layer 140, undesired or unexpected interference or reflection may also be reduced, which is beneficial to the improvement of optical imaging quality.

Figure 5B:
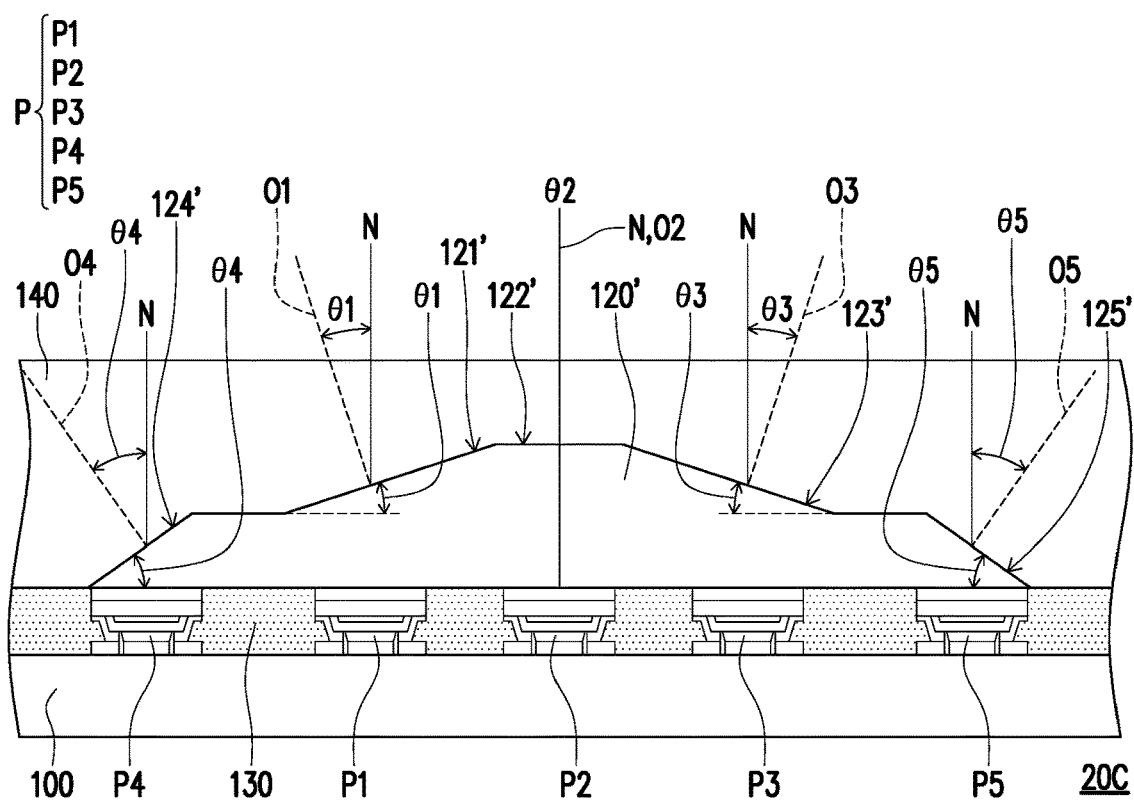
FIG. 5B is a partially enlarged cross-sectional view of a display device of the fourth embodiment of the invention.

FIG. 5B is a partially enlarged cross-sectional view of the display device of the fourth embodiment of the invention. Referring to FIG. 5B, a display device 20C of the present embodiment is similar to the display device 20B in FIG. 5A, and the main difference is that the configuration of an optical path adjusting element 120' is different, and the configurations of the sub-pixels are also different. In detail, the optical path adjusting element 120' further includes a fourth slope 124' and a fifth slope 125' respectively located at two sides of the second slope 122'. Moreover, there is the fourth angle $\theta 4$ between the fourth slope 124' and the plane of the substrate 100, and there is the fifth angle $\theta 5$ between the fifth slope 125' and the plane of the substrate 100, wherein $\theta 4=\theta 5$, $\theta 4>\theta 1$, and $\theta 4>\theta 3$. Moreover, the pixels P further include the fourth sub-pixel P4 and the fifth sub-pixel P5, there is the fourth angle $\theta 4$ between the fourth slope 124' the light-emitting surface of the fourth sub-pixel P4, and there is the fifth angle $\theta 5$ between the fifth slope 125' and the light-emitting surface of the fifth sub-pixel P5. In particular, the light-emitting directions (such as the main light-emitting direction O1, the main light-emitting direction O2, the main light-emitting direction O3, the main light-emitting direction O4, and the main light-emitting direction O5) of the first sub-pixel P1, the second sub-pixel P2, the third sub-pixel P3, the fourth sub-pixel P4, and the fifth sub-pixel P5 are different from each other. Furthermore, the main light-emitting direction O1, the main light-emitting direction O2, the main light-emitting direction O3, the main light-emitting direction O4, and the main light-emitting direction O5 may be diverged from each other.

Based on the above, since the fourth angle $\theta 4$ and the fifth angle $\theta 5$ between the slope of the optical path adjusting element 120' and the substrate 100 may also have larger tilt angles, good stereoscopic images may also be provided for users viewing from a large viewing angle (for example, the user U2 and the user U3 in FIG. 4B) to achieve the same effect as the display device 20A in FIG. 4A, and to satisfy the working principle of the display device 20A in FIG. 4B. For related technical contents, reference may be made to the above paragraphs, and details are not repeated here.

Moreover, due to the liquid-crystal display at a large angle (for example, a viewing angle of 40 degrees or more), there is an issue of light leakage in a dark state or a decrease in brightness at the edge of the display image. The fourth angle $\theta 4$ and the fifth angle $\theta 5$ of the optical path adjusting element 120' may be substantially 40 degrees. In this way, a suitable light-emitting angle may also be adjusted via the optical path adjusting element 120', so as to solve the issue of the decrease in the brightness D1 of the display device at a large viewing angle as shown in FIG. 3B to improve the contrast so that the stereoscopic display image has a good display image.

Figure 6A:
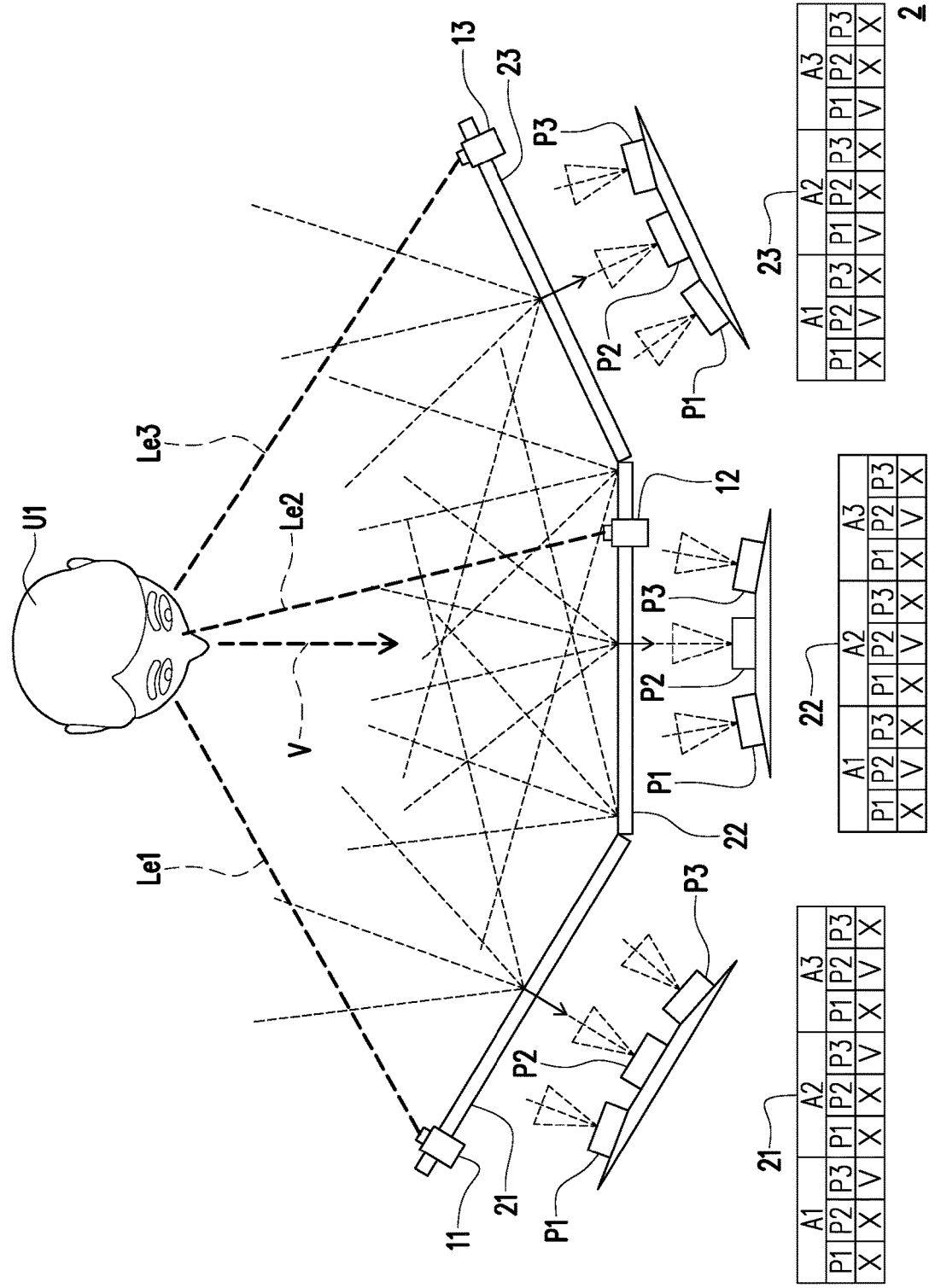
FIG. 6A to FIG. 6C are schematic diagrams of the working principle of a stereoscopic display device of the invention.
Figure 6B:
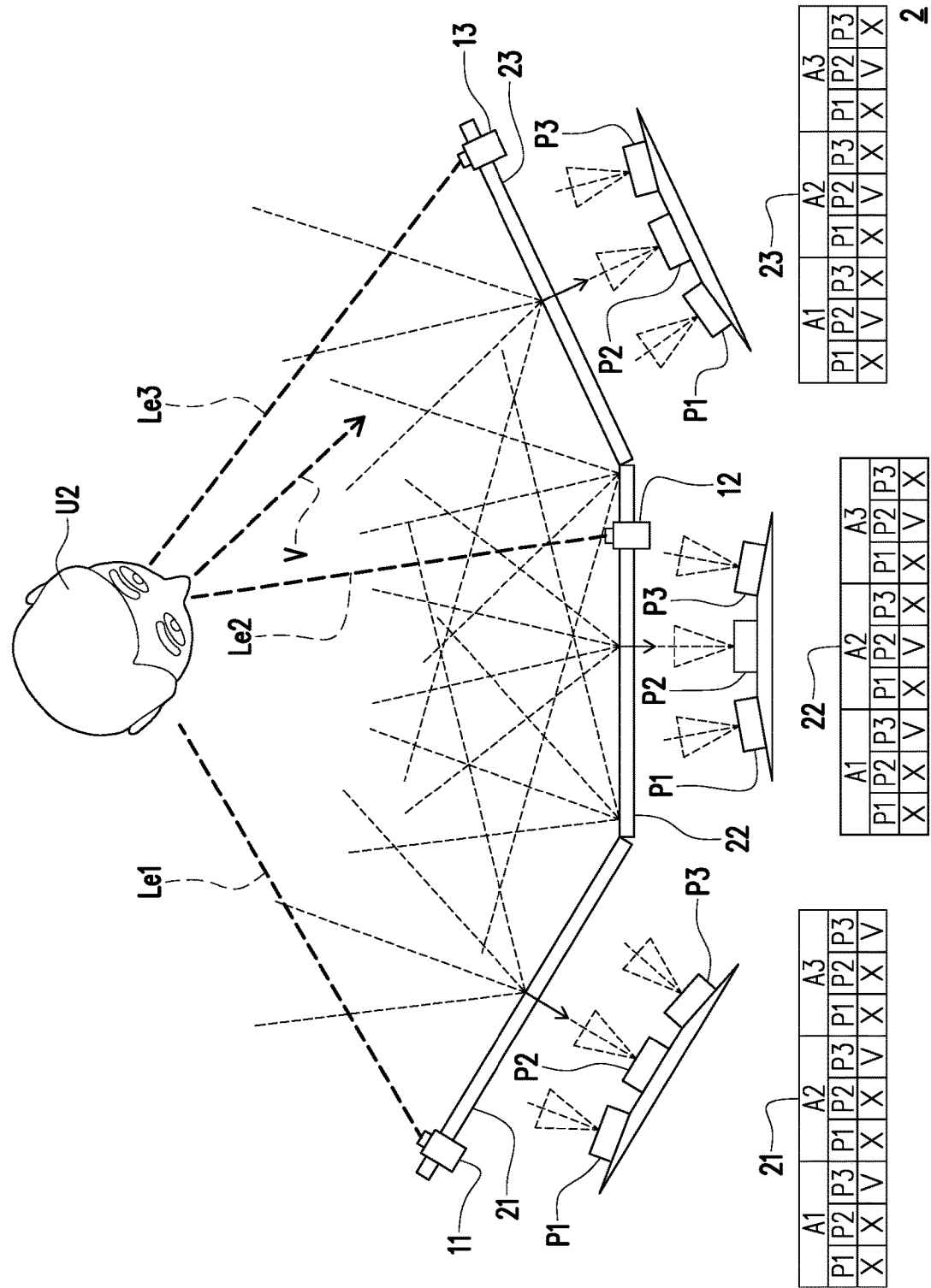
Figure 6C:
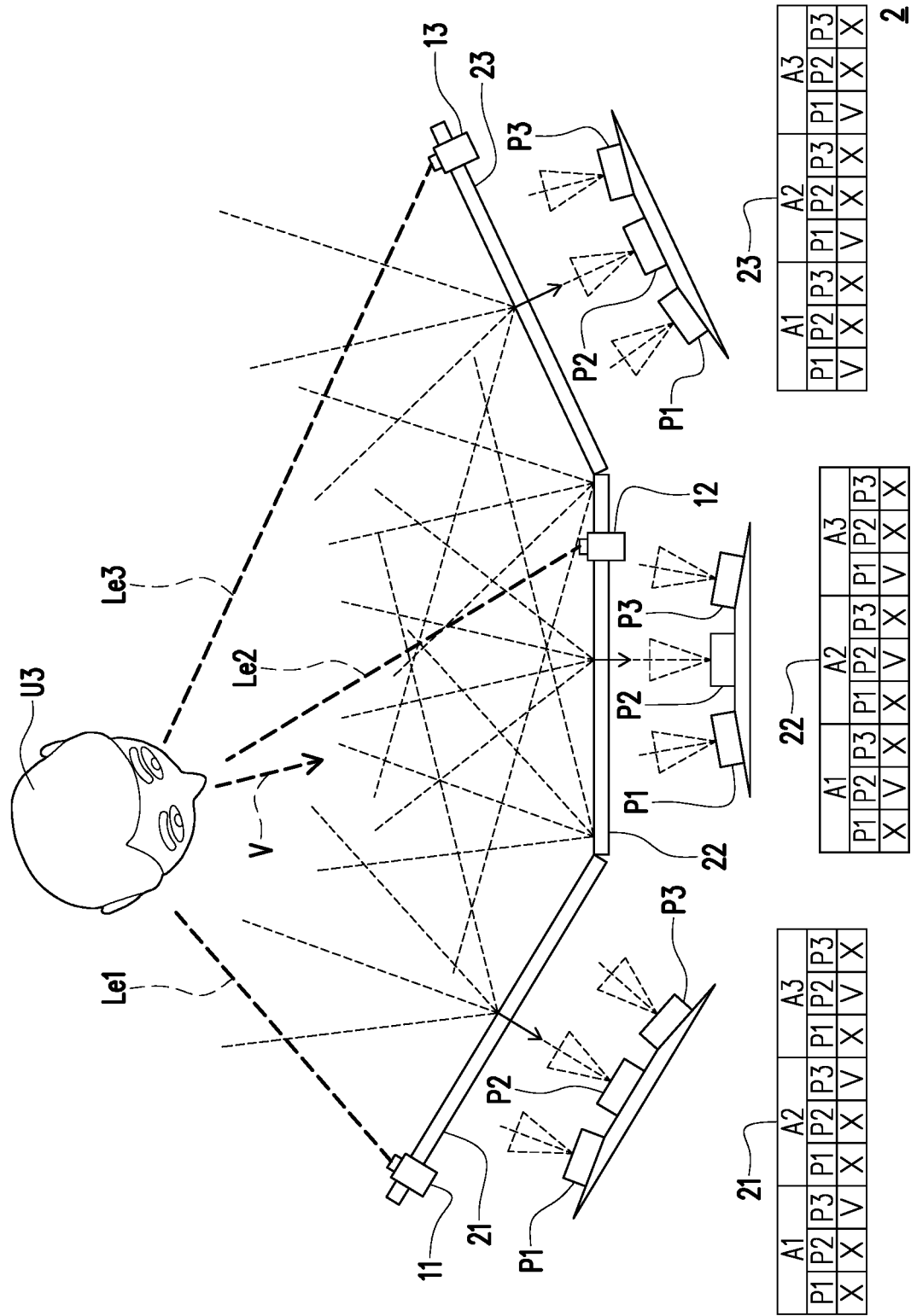

FIG. 6A to FIG. 6C are schematic diagrams of the working principle of a stereoscopic display device of the invention. The working principle of a stereoscopic display device 2 of the invention is described below. In particular, the stereoscopic display device 2 may be a tiled stereoscopic display device, which may be formed by tiling the stereoscopic display device 1 in FIG. 1. Therefore, the stereoscopic display device 2 may include a first display surface 21, a second display surface 22, and a third display surface 23, and the second display surface 22 is located between the first display surface 21 and the third display surface 23, wherein the first display surface 21, the second display surface 22, and the third display surface 23 surround the user U1, the user U2, or the user U3. It should be noted that the stereoscopic display device 2 of FIG. 6A to FIG. 6C adopts the embodiment of the display device 20 for illustration, but the invention is not limited thereto. In other embodiments, the stereoscopic display device may also be formed by tiling the display devices in other embodiments above.

Moreover, the sensing device 10 may further include a first sensor 11, a second sensor 12, and a third sensor 13 respectively disposed on the first display surface 21, the second display surface 22, and the third display surface 23, wherein the first sensor 11 is suitable for sensing the viewing angle V of the user U1 and a first distance Le1 between the first sensor 11 and the user U1; the second sensor 12 is suitable for sensing the viewing angle V of the user U2 and a second distance Le2 between the second sensor 12 and the user U1; the third sensor 13 is suitable for sensing the viewing angle V of the user U1 and a third distance Le3 between the third sensor 13 and the user U1. The position information of the user U may include the first distance Le1, the second distance Le2, and the third distance Le3. In this way, the sensing device 10 may communicate the viewing angle information and the position information to the surround view display device correspondingly for different viewing angles or positions of the user U1, so as to provide a suitable stereoscopic display image.

Moreover, the first display surface 21, the second display surface 22, and the third display surface 23 may respectively include a first display area A1, a second display area A2, and a third display area A3. The second display area A2 is located between the first display area A1 and the third display area A3, wherein the plurality of pixels P (or the pixel PR, the pixel PG, and the pixel PB, etc.) are disposed in the first display area A1, the second display area A2, and the third display area A3. For example, the third display area A3 may refer to the right display images of the display surface 21, the display surface 22, and the display surface 23 in the stereoscopic display device 2. Similarly, the first display area A1 may refer to the left display images of the display surface 21, the display surface 22, and the display surface 23 in the stereoscopic display device 2. Of course, the invention is not limited thereto. For the first display area A1, the second display area A2, and the third display area A3 of the first display surface 21, the second display surface 22, and the third display surface 23 in FIG. 6A to FIG. 6C respectively, a tick mark thereof represents that the sub-pixel is controlled to be turned on by the display device 20; and a cross mark represents that the sub-pixel is controlled to be turned off by the display device 20.

Taking FIG. 6A as an example, when the user U1 is located in the center of the stereoscopic display device 2 and faces the display surface 22 (that is, the viewing angle V is substantially vertical to the display surface 22), the first sensor 11, the second sensor 12, and the third sensor 13 may sense the first distance Le1, the second distance Le2, and the third distance Le3 to estimate the position of the user U1, and the viewing angle V of the user U1 is simultaneously sensed by an eye tracking device or the like. The above information is transmitted to the first display surface 21, the second display surface 22, and the third display surface 23 of the display device. At this time, the third sub-pixel P3 in the plurality of pixels P of the first display area A1 and the second display area A2 of the first display surface 21 is turned on, and since the third display area A3 has a smaller viewing angle with the user U1, the second sub-pixel P2 in the plurality of pixels P thereof is turned on, and the rest of the sub-pixels are turned off. Since the user U1 faces the second display surface 22, the second sub-pixel P2 in the plurality of pixels P of the first display area A1, the second display area A2, and the third display area A3 of the second display surface 22 is turned on, and the rest of the sub-pixels are turned off. Since the first display area A1 of the third display surface 23 has a smaller viewing angle with the user U1, the second sub-pixel P2 in the plurality of pixels P is turned on, and the first sub-pixel P1 in the plurality of pixels P of the second display area A2 and the third display area A3 is turned on, and the rest of the sub-pixels are turned off. In this way, the user U1 may view stereoscopic images with less crosstalk and better display quality.

Taking FIG. 6B as an example, when the user U2 is located in the center of the stereoscopic display device 2 and looks at the display surface 23 from the side (that is, the viewing angle V faces the display surface 23), the first sensor 11, the second sensor 12, and the third sensor 13 may sense the first distance Le1, the second distance Le2, and the third distance Le3 to estimate the position of the user U2, and the viewing angle V of the user U1 is simultaneously sensed by an eye tracking device or the like. The above information is transmitted to the first display surface 21, the second display surface 22, and the third display surface 23 of the display device. At this time, since the viewing angle between the first display surface 21 and the user U2 is very large, the third sub-pixel P3 in the plurality of pixels P of the first display area A1, the second display area A2, and the third display area A3 of the first display surface 21 is turned on, and the rest of the sub-pixels are turned off. The third sub-pixel P3 in the plurality of pixels P of the first display area A1 of the second display surface 22 is turned on, and the second sub-pixel P2 in the plurality of pixels P of the second display area A2 and the third display area A3 of the second display surface 22 is turned on, and the rest of the sub-pixels are turned off. Since the user U2 faces the third display surface 23, the third sub-pixel P2 in the plurality of pixels P of the first display area A1, the second display area A2, and the third display area A3 of the second display surface 23 is turned on, and the rest of the sub-pixels are turned off. In this way, the user U2 may also view stereoscopic images with less crosstalk and better display quality.

Taking FIG. 6C as an example, when the user U3 is located in front of the stereoscopic display device 2 and is closer to the display surface 21, and at the same time looks sideways at the display surface 22 (that is, there is an included angle between the viewing angle V and the normal N of the display surface 22), the first sensor 11, the second sensor 12, and the third sensor 13 may sense Le1<Le2<Le3 to estimate the position of the user U3 and simultaneously sense the viewing angle V of the user U1 by an eye tracking device or the like. The above information is transmitted to the first display surface 21, the second display surface 22, and the third display surface 23 of the display device. At this time, the third sub-pixel P3 in the plurality of pixels P of the first display area A1 and the second display area A2 of the first display surface 21 is turned on, and the second sub-pixel P2 in the plurality of pixels P of the third display area A3 is turned on, and the rest of the sub-pixels are turned off. The second sub-pixel P2 in the plurality of pixels P of the first display area A1 and the second display area A2 of the second display surface 22 is turned on, and since the third display area A3 has a larger viewing angle, the first sub-pixel P1 in the plurality of pixels P of the third display area A3 is turned on, and the rest of the sub-pixels are turned off. The first sub-pixel P1 in the plurality of pixels P in the first display area A1, the second display area A2, and the third display area A3 of the third display surface 23 is turned on, and the rest of the sub-pixels are turned off. In this way, the user U3 may also view stereoscopic images with less crosstalk and better display quality.

Based on the above, the sensing device 10 is suitable for sensing the viewing angle V of the user and the first distance Le1, the second distance Le2, and the third distance Le3, and convert the above information into viewing angle information and position information to be transmitted to the display device 20. Via the display device 20, one of the first sub-pixel P1, the second sub-pixel P2, and the third sub-pixel P3 in the plurality of pixels P in each of the first display area A1, the second display area A2, and the third display area A3 is correspondingly turned on, and the other two of the first sub-pixel P1, the second sub-pixel P2, and the third sub-pixel P3 are turned off, so as to provide the user with an optimized stereoscopic image.

It is worth mentioning that the brightness of each of the first display surface 21, the second display surface 22, and the third display surface 23 may also be adjusted correspondingly according to the different viewing angle or position of the user. The issue that the display images are not continuous due to discontinuous brightness at the tiling part of each of the display surfaces is solved.

Please refer to FIG. 3C and FIG. 6B at the same time. For example, when the brightness of the second display surface 22 and the third display surface 23 is 100%, the user U2 observes the tiling part of the second display surface 22 and the third display surface 23 and may find that the brightness between different display surfaces is discontinuous (for example, the display device brightness D1 in FIG. 3B may represent the brightness of the third display surface 23, and there may be only 50% brightness left at the large viewing angle, and the display device brightness D2 may represent the brightness of the second display surface 22 and may be close to 100%). At this time, the brightness of the second display surface 22 may be reduced, so that the brightness of the tiling part of the second display surface 22 and the third display surface 23 may be consistent to avoid the issue of discontinuous display images at the tiling part, and achieve the effect of saving power and reducing power consumption at the same time.

Based on the above, the main light-emitting direction of each of the sub-pixels of the invention has at least two or more tilt angles with respect to the plane of the substrate. In addition, the viewing angle information of the user and the position information of the user and the sensing device may be obtained via the sensing device, so as to provide the emission angle of the display device in different areas to reduce the interference of stereoscopic image crosstalk and achieve optimal stereoscopic image display effect under full-plane display.

What is claimed is:
1. A stereoscopic display device, comprising:
a sensing device, wherein the sensing device senses position information and viewing angle information of a user; and
a display device connected to the sensing device, wherein the display device receives the position information and the viewing angle information, and the display device comprises:
a substrate; and
a plurality of pixels disposed on the substrate, wherein, each of the pixels comprises a first sub-pixel, a second sub-pixel, and a third sub-pixel, wherein main light- emitting directions of the first sub-pixel, the second sub-pixel, and the third sub-pixel are different from each other, the display device correspondingly turns on at least one of the first sub-pixel, the second sub-pixel, and the third sub-pixel and turns off at least another of the first sub-pixel, the second sub-pixel, and the third sub-pixel based on the position information and the viewing angle information.

2. The stereoscopic display device of claim 1, wherein the second sub-pixel is disposed between the first sub-pixel and the third sub-pixel, there is a first angle θ1 between the main light-emitting direction of the first sub-pixel and a normal of the substrate, there is a second angle θ2 between the main light-emitting direction of the second sub-pixel and the normal of the substrate, and there is a third angle θ3 between the main light-emitting direction of the third sub-pixel and the normal of the substrate, wherein a size of θ1, θ2, and θ3 satisfies the following relationship: θ1=θ2+k(x)*a; θ3=θ2+k(x)*a, wherein k(x) is a variable equation corresponding to different resolution displays, and a is a positive integer.

3. The stereoscopic display device of claim 2, further comprising:
a base, wherein the first sub-pixel, the second sub-pixel, and the third sub-pixel are disposed on the substrate via the base,
wherein the base has a first slope, a second slope, and a third slope, there is the first angle θ1 between the first slope and a plane of the substrate, there is the second angle θ2 between the second slope and the plane of the substrate, there is the third angle θ3 between the third slope and the plane of the substrate, and the first sub-pixel, the second sub-pixel, and the third sub-pixel are respectively disposed on the first slope, the second slope, and the third slope.

4. The stereoscopic display device of claim 3, wherein, the base also comprises a fourth slope and a fifth slope respectively located at two sides of the second slope, there is a fourth angle θ4 between the fourth slope and the plane of the substrate, and there is a fifth angle θ5 between the fifth slope and the plane of the substrate, wherein θ4=θ5, θ4>θ1 and θ4>θ3,
the pixel further comprises a fourth sub-pixel and a fifth sub-pixel respectively disposed on the fourth slope and the fifth slope, and main light-emitting directions of the first sub-pixel, the second sub-pixel, the third sub-pixel, the fourth sub-pixel, and the fifth sub-pixel are different from each other.

5. The stereoscopic display device of claim 4, wherein θ4 and θ5 are substantially 40 degrees.

6. The stereoscopic display device of claim 4, wherein, when a line of sight of the user is substantially parallel to the normal of the substrate, only the second sub-pixel of the pixels is turned on,
when an included angle between the line of sight of the user and the normal of the substrate is between 2 degrees and θ5, only one of the first sub-pixel and the second sub-pixel of the pixels is turned on,
when the included angle between the line of sight of the user and the normal of the substrate is greater than θ5, only one of the fourth sub-pixel and the fifth sub-pixel of the pixels is turned on.

7. The stereoscopic display device of claim 1, wherein each of the first sub-pixel, the second sub-pixel, and the third sub-pixel comprises one of a micro light-emitting diode and an organic light-emitting diode.

8. The stereoscopic display device of claim 1, further comprising:
an optical path adjusting element, wherein the pixels are disposed between the optical path adjusting element and the substrate,
wherein the optical path adjusting element has a first slope, a second slope, and a third slope, there is a first angle θ1 between the first slope and a light-emitting surface of the first sub-pixel, the second slope is located between the first slope and the third slope, there is a third angle θ3 between the third slope and a light-emitting surface of the third sub-pixel, and the optical path adjusting element changes the main light-emitting directions of the first sub-pixel, the second sub-pixel, and the third sub-pixel, so that the main light-emitting directions of the first sub-pixel, the second sub-pixel, and the third sub-pixel are different from each other.

9. The stereoscopic display device of claim 8, further comprising:
an insulating material disposed between the first sub-pixel, the second sub-pixel, and the third sub-pixel.

10. The stereoscopic display device of claim 8, further comprising:
a light-transmitting layer, wherein the optical path adjusting element is disposed between the light-transmitting layer and the pixels, and a refractive index of the light-transmitting layer is different from a refractive index of the optical path adjusting element.

11. The stereoscopic display device of claim 8, wherein, the optical adjusting element also comprises a fourth slope and a fifth slope respectively located at two sides of the second slope, there is a fourth angle θ4 between the fourth slope and a plane of the substrate, and there is a fifth angle θ5 between the fifth slope and the plane of the substrate, wherein θ4=θ5, θ4>θ1 and θ4>θ3,
the pixels also comprise a fourth sub-pixel and a fifth sub-pixel, wherein there is the fourth angle θ4 between the fourth slope and a light-emitting surface of the fourth sub-pixel, and there is the fifth angle θ5 between the fifth slope and a light-emitting surface of the fifth sub-pixel.

12. The stereoscopic display device of claim 11, wherein θ4 and θ5 are substantially 40 degrees.

13. The stereoscopic display device of claim 1, wherein the display device further comprises:
a first display surface, a second display surface, and a third display surface, wherein the second display surface is located between the first display surface and the third display surface, and the first display surface, the second display surface, and the third display surface surround the user.

14. The stereoscopic display device of claim 13, wherein the sensing device further comprises:
a first sensor, a second sensor, and a third sensor respectively disposed on the first display surface, the second display surface, and the third display surface, wherein the location information comprises a first distance, a second distance, and a third distance, wherein,
the first distance is a distance between the first sensor and the user;
the second distance is a distance between the second sensor and the user;
the third distance is a distance between the third sensor and the user.

15. The stereoscopic display device of claim 14, wherein,
the first display surface, the second display surface, and the third display surface respectively comprise a first display area, a second display area, and a third display area,
the second display area is located between the first display area and the third display area,
the pixels are disposed in the first display area, the second display area, and the third display area,
the display device correspondingly turns on one of the first sub-pixel, the second sub-pixel, and the third sub-pixel of the pixels in the first display area, the second display area, and the third display area and turns off the other two of the first sub-pixel, the second sub-pixel, and the third sub-pixel according to the viewing angle information and the position information.

16. The stereoscopic display device of claim 1, wherein wavelengths of light beams emitted by the first sub-pixel, the second sub-pixel, and the third sub-pixel are substantially the same.

\* \* \* \* \*